Sept. 25, 1923.  
G. F. UNDERWOOD ET AL  
1,469,029  
RUBBER GLOVE  
Filed March 9, 1923
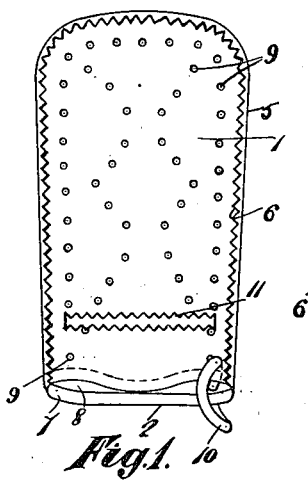
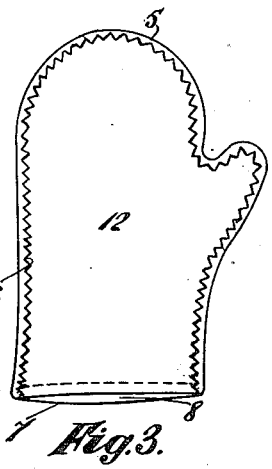
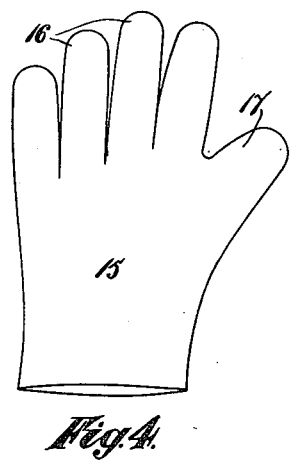
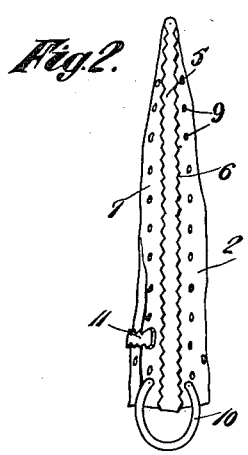
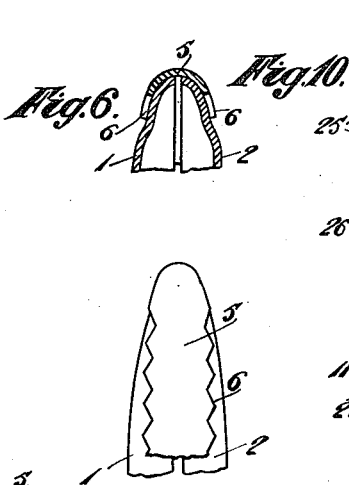
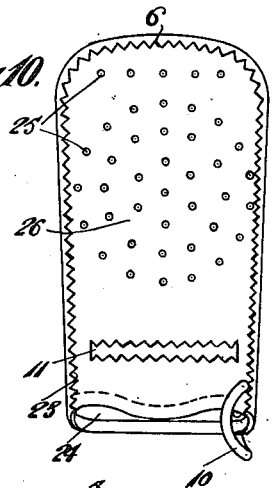
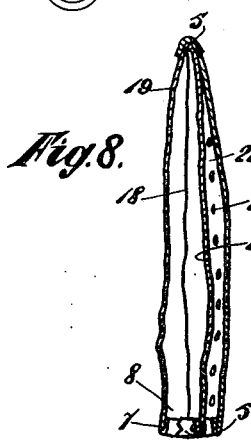
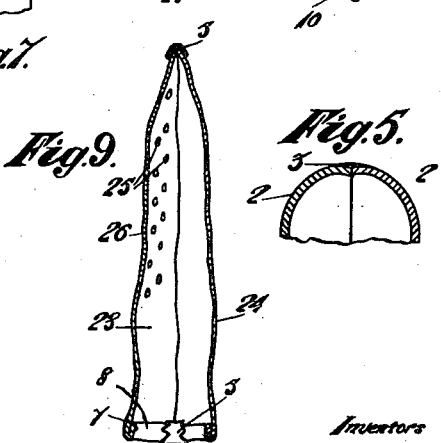

Patented Sept. 25, 1923.

1,469,029

UNITED STATES PATENT OFFICE.

GEORGE F. UNDERWOOD, OF LONDON, AND WILLIAM LUFFSMITH, OF BRIGHTON, ENGLAND, ASSIGNORS TO PLANTATION RUBBER MANUFACTURING COMPANY LIMITED. OF LONDON, ENGLAND.

RUBBER GLOVE.

Application filed March 9, 1923. Serial No. 623,954.

*To all whom it may concern:*

Be it known that we, GEORGE FREDERICK UNDERWOOD and WILLIAM LUFFSMITH, subjects of the King of Great Britain and Ireland, residing at, respectively, 5 Fenchurch Street, in the county of London, England, and 63 Old Steine, Brighton, in the county of Sussex, England, have invented a new and useful Improvement in Rubber Gloves, of which the following is a specification.

Our invention relates to improvements in rubber gloves for electrical, surgical, lathering, domestic and other purposes.

According to this invention the gloves are formed by cutting from sheets of uncured plantation rubber, preferably rubber crêpe. Two sheets of rubber are placed together or a single sheet folded over upon itself and the gloves are cut to the required outline by means of suitable cutters, such as dies, or with scissors or the like by hand. The act of cutting out the shape of the gloves causes the edges of the raw plantation rubber to adhere together along the edge of the cutting and when these have been vulcanized or otherwise suitably treated, the two portions forming the back and the front of the glove will be firmly secured together. If desired, when it is not intended to vulcanize the finished glove, the edges may be further secured by means of solution or a suitable chemical applied to the edges of the glove.

The raw plantation rubber or crêpe may be used in various forms, either completely impervious or with a series of perforations or openings therein, or suitable perforations may be provided where required by stamping or cutting in the thickness of the material.

When required for electrical or surgical purposes the gloves are formed of impervious rubber, but for domestic and like purposes the pervious or perforated form of plantation rubber is employed.

This latter type is particularly suitable for rubbing or scrubbing clothes and for other washing purposes and assists the soap to make an excellent lather and keeps the user's hands in a smooth soft condition.

The gloves may be vulcanized by the well known "Peachey" cold vulcanizing process or any other suitable vulcanizing process may be employed.

In order that our invention may be more readily understood, reference is made to the accompanying sheet of drawings, in which:—

Figures 1 and 2 show respectively front and side elevation of a bath glove, constructed from plantation rubber crêpe according to our invention.

Figure 3 shows an example of a glove of mitten form.

Figure 4 is an elevation of a glove constructed according to our invention and provided with separate fingers and thumb.

Figures 5, 6 and 7 are detail views showing the manner in which the cut edges of the glove are connected together.

Figure 8 shows in section a form of glove having a double wall upon one side so as to form a receptacle for soap, powder or other material, and Figures 9 and 10 are respectively section and front elevation of a bath glove perforated on one side only, so that it may act as a spray or shower bath for water contained therein.

Referring to Figures 1, 2, 5, 6 and 7 the bath glove is formed from two sheets of uncured plantation rubber crêpe placed face to face, and cut around their edges to the desired shape forming the back and front 1 and 2 of the glove respectively. According to our improved method we use crêpe rubber that is to say, pure rubber as it comes from the initial rolling and dried naturally. This operation of cutting the edges of the glove to shape will cause them to adhere together in the manner indicated at 3 in Figure 5. This greatly cheapens the manufacture and such simultaneous cutting and uniting cannot be done with any rubber or rubber compound other than crêpe rubber such as we employ. The joint formed around the edges may then if desired be covered with a cover strip 5, having serrated edges 6 extending over the edges of the back and front 1 and 2 of the glove. This strip will adhere to the rubber crêpe forming the back and front of the glove so as to ensure a strong joint between them. The edges 7 at the mouth 8 of the glove may be turned inwardly so as to adhere together and form a bead or stiffened edge around the mouth 8. This feature prevents tearing at the mouth. Both front 1 and back 2 of the glove are provided with a series of perforations 9 distributed at intervals over their surface, so as to allow water and soap to penetrate through them and to assist in causing an effective lather. The glove may be provided with a loop 10 at one corner formed by rolling plantation rubber crêpe up into a cord or string form, and attaching the ends by passing them through holes in the front and back 1 and 2 of the glove and securing them together on the inside thereof. A short strip 11 of plantation rubber crêpe is arranged across the front 1 of the glove at approximately the position which the user's wrist will occupy. The provision of the strip 11 renders the glove at this position (the wrist) less elastic or less stretchable. The gloves are somewhat smaller than the hand for which they are intended so that the act of putting them on stretches the hand part with the result that the wrist part where the strip 11 is clings tightly to the wrist and prevents the glove from slipping off. Were it not for the strips 11 the gloves would have to be carefully cut or shaped to the wrist. The strip 11 avoids this necessity for careful cutting or shaping.

The whole glove when completed is submitted to a suitable vulcanizing process preferably the well known "Peachey" cold vulcanizing process, and when this is completed, all the parts of the glove will be firmly secured together so as to form a bath glove of a durable and lasting nature. Such a bath glove has most effective properties for washing purposes, being of a soft and clingy nature and producing a most effective lather with a minimum quantity of soap.

Figure 3 shows a form of glove 12 of mitten shape in which a portion 13 is provided for the fingers and a separate portion 14 for the thumb. This is constructed in a manner similar to that described with reference to Figures 1, 2, 5, 6 and 7 and whilst no perforations are shown, these may be provided on either one or both sides thereof.

Figure 4 shows another form of glove 15 in which separate fingers 16 are provided and a thumb 17. In this case the two sheets of uncured plantation rubber crêpe forming the front and back of the rubber glove are merely placed together and cut so as to produce a joint as indicated at 3 in Figure 5. This may then be covered with solution and vulcanized or may be vulcanized direct without the solution so as to firmly join the two portions together.

Referring now to Figure 8, a glove 18 constructed substantially as described with reference to Figures 1 and 2, is provided with an unperforated back 19 and a perforated front 20. Within the glove and behind the perforated front 20 is an intermediate sheet 21 arranged so as to form a pocket or receptacle 22 between it and the perforated front 20. This pocket or receptacle may be employed for the reception of soap for washing purposes which will be retained therein and will lather copiously through the perforations in the front portion 20. The soap thus contained in this pocket is always retained therein and cannot escape, however small. This arrangement may also be employed for the application of powder or other material to the skin of the user or for other purposes by placing a suitable talc powder or other medium therein, when it will be delivered in small quantities through the perforations in the front 20.

In Figures 9 and 10 is shown a bath glove 23 having an unperforated back 24 whilst a ring of perforations 25 are arranged in the front 26 of the glove near its closed end. This glove may then be used to act as a spray or to produce a shower by the user placing a hand therein and then filling the glove with water and allowing it to run out through the perforations.

Where desired, the rubber crêpe or other material may be dressed with suitable solution in order to render it impervious and subsequently vulcanized by the well known "Peachey" cold vulcanizing or other suitable process. Milled rubber sheet perforated on one or both sides may be substituted for uncured rubber crêpe if desired.

We claim:—

1. A rubber glove including a plurality of outside sheets and an intermediate sheet of rubber, substantially coextensive in area, means securing the edges of the sheets together except at one end, whereby a wrist opening and an article receiving opening are formed, one of the outside sheets being perforated, and means rendering a portion of the glove adjacent the wrist opening less elastic than the remaining portions of the glove.

2. A rubber glove including a pair of outside sheets and an intermediate sheet of rubber substantially coextensive in area, secured together along their edges except at the wrist end of the glove, one of the outside sheets being perforated.

3. A rubber glove including a pair of outside sheets and an intermediate sheet of rubber secured together along their edges except at the wrist end of the glove, one of the outside sheets being perforated, and means reducing the elasticity of the glove at a portion thereof adjacent the wrist of the glove.

GEORGE F. UNDERWOOD.
WM. LUFFSMITH.